United States Patent

[11] 3,605,030

| [72] | Inventor | Marshall D. Elmore |
| | | Norwalk, Calif. |
| [21] | Appl. No. | 648,765 |
| [22] | Filed | June 26, 1967 |
| [45] | Patented | Sept. 14, 1971 |
| [73] | Assignee | Beckman Instruments, Inc. |

[54] HIGH SENSITIVITY AMPLIFIER WITH PEAK DETECTOR AND STORAGE MEANS
10 Claims, 1 Drawing Fig.

[52] U.S. Cl.................................................. 329/104,
330/30
[51] Int. Cl..................................................... H03k 9/00,
H03f 3/68
[50] Field of Search........................................... 307/246;
328/151; 329/104; 330/30 D, 69

[56] References Cited
UNITED STATES PATENTS
| 2,801,296 | 7/1957 | Blecher...................... | 329/104 |
| 2,833,921 | 5/1958 | McCrory..................... | 330/69 |

*Primary Examiner*—Roy Lake
*Assistant Examiner*—Lawrence J. Dahl
*Attorneys*—Robert J. Steinmeyer and Paul R. Harder ABSTRACT: A high sensitivity electrometer employing a capacitor to accumulate an electronic charge over a relatively long period and a first switch for coupling the charge to an operational amplifier over a short period. An inverting capacitively coupled amplifier drives a storage circuit comprising a peak detector and memory capacitor. A second switch synchronized with the first switch couples the storage circuit to the operational amplifier through a filter network to apply the stored peak voltage in the memory capacitor as a direct coupled electrometer input signal.

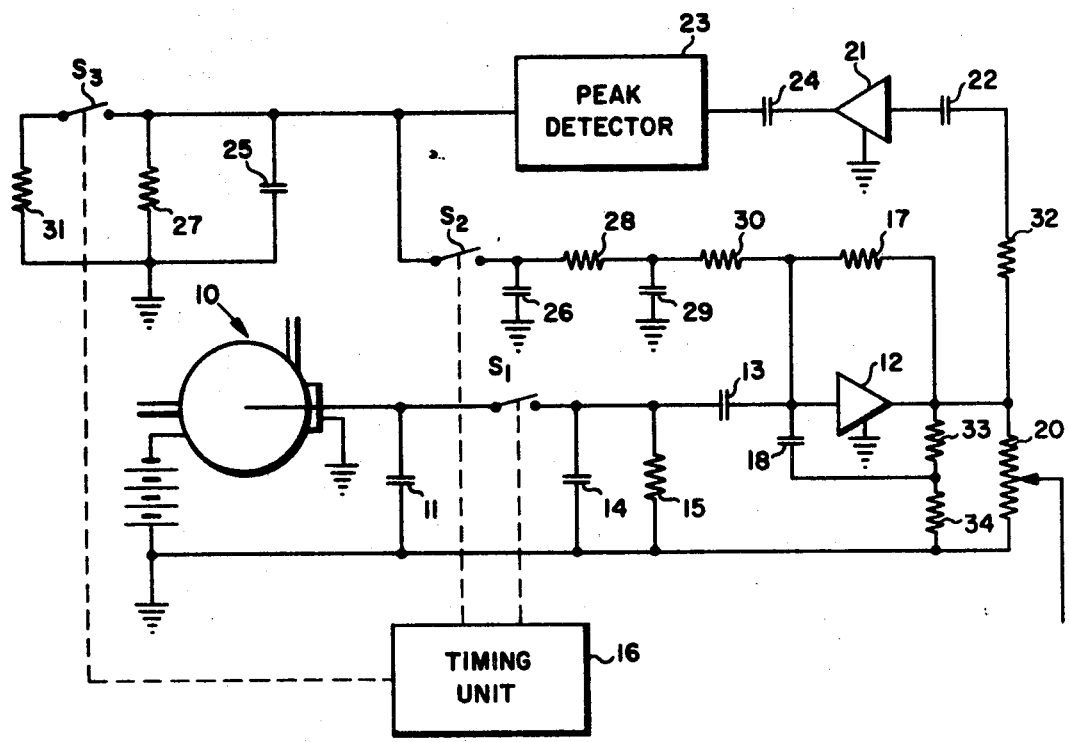
MARSHALL D. ELMORE
INVENTOR.
BY A. M. Fernandez
ATTORNEY

HIGH SENSITIVITY AMPLIFIER WITH PEAK DETECTOR AND STORAGE MEANS

This invention relates to a high sensitivity amplifier and more particularly to an electrometer for measurement of minute signals from, for example, an ionization chamber in discrete sample measurement or continuous measurement.

Many laboratory instruments, such as gas chromatographs and pH meters, require micro-microameters with a sensitivity of $5 \times 10^{-13}$ amperes full scale. Electrometers have been developed in the past for such applications. However, some applications require greater sensitivity. For instance, in biomedical instrumentation, it is often necessary to measure the current output of an ionization chamber in the order of $10^{-16}$ to $10^{-15}$ amperes. One application for such a high sensitivity electrometer is for measurement of radioactive carbon dioxide ($C^{14}O_2$) in continuous breath analysis using an ionization chamber.

One prior art electrometer described in U.S. Pat. No. 2,970,266 provides synchronously operated relay switches with a feedback network for self-compensating or self-zeroing to minimize internal effects due to component variations, power supply variations and the like. That is accomplished by storing in a memory unit a correction signal which is a function of the output of the amplifier while the input of the amplifier is connected to a reference signal or ground. The correction signal thus stored during one phase is combined with the signal to be measured during a subsequent phase so as to compensate for undesired internal variations. However, this does not directly improve the sensitivity of the electrometer, only the stability.

An object of this invention is to provide an improved high sensitivity electrometer.

Another object of this invention is to provide an electrometer having a very high average input impedance.

These and other objects of the invention are achieved in a high sensitivity amplifier for minute currents by providing a first means for receiving and accumulating or storing a charge in proportion to the magnitude of the minute current over a relatively long period of time, such as 20 seconds, and for transferring the minute charge stored to the input node of a DC operational amplifier over a shorter period of time such as 40 milliseconds. The output of the DC operational amplifier, which preferably includes electrometer tubes at the input stage thereof, is connected to a recorder or digital voltmeter, and to a peak detector. A second means connected to the output of the peak detector is provided for receiving and storing the peak signal during at least a portion of the time the first means is storing or accumulating a charge, and for transferring the peak signal thus stored to the operational amplifier in addition to the minute signal input during at least all of the time the minute signal is being transferred to the operational amplifier.

Other objects and advantages of the invention will become apparent from the following description and claims, taken together with the sole FIGURE in the accompanying drawing which discloses a schematic diagram of a preferred embodiment of the invention.

In the preferred embodiment, illustrated by way of example only as being connected to an ionization chamber generally illustrated by the reference numeral 10, a first capacitor 11 is connected to integrate or accumulate a charge in proportion to the magnitude of a minute current from the ionization chamber 10. After a relatively long period of time, for example 20 seconds, a switch $S_1$ is closed for a shorter period, such as 40 milliseconds, to transfer the charge stored in the capacitor 11 to a DC operational amplifier 12 via a DC blocking capacitor 13.

A filter capacitor 14, and discharge resistor 15 are provided to integrate the effects of chatter in the switch $S_1$, and to discharge the storage capacitor. Thus, the provision of the capacitor 14 and the value of the resistor 15 may depend upon the nature or design of the switch $S_1$. In this preferred embodiment, magnetic reed relay switches are employed since relatively slow switching speeds, high insulation resistance and electrostatic shielding are required. In this example the switching involves 40 millisecond closures ever 20 seconds. Transfer of a charge from the integrating capacitor 11 to the amplifier 12 results in a voltage spike of approximately 20 milliseconds duration when the switch $S_1$ is closed for 40 milliseconds under the control of a timing unit 16.

The output of the electrometer amplifier 12 is coupled to its input to provide inverse feedback through a resistor 17. In that manner, a summing junction for the addition of signals is provided at its input terminal. An additional feedback signal is coupled to that summing junction by a capacitor 18 for frequency gain stabilization as required. Although many designs may be employed for the amplifier 12, in this preferred embodiment, it is basically a high gain DC amplifier with the operational feedback resistor 17. The characteristics of the amplifier are: stability, high current sensitivity, high input impedance, and low output impedance. The arrangement of the integrating capacitor 11, switch $S_1$ and coupling capacitor 13 acts as a high impedance to a constant current DC source. The input impedance of the DC amplifier is so high that amplifier input current is negligible. Therefore, virtually all of the current flows through the resistor 17 and the output voltage from the amplifier is a precise function of input current.

The input stage of the amplifier 12 is preferably an electrometer tube specially selected and treated for low noise. Following the electrometer tube, there are a plurality of stages the last of which is preferably a cathode follower or emitter follower to provide a low output impedance. The number of stages provided are such as to provide inverse feedback over the resistor 17. The potentiometer 20 connected to the output of the amplifier 12 provides the desired voltage output level for a recorder, digital voltmeter or the like.

The output of the amplifier 12 is coupled to an inverting amplifier 21 by a capacitor 22. The amplifier 21 is preferably a single stage transistor amplifier so connected and biased as to provide a voltage gain of 10.

The output of the amplifier 21 is coupled to a peak detector 23 by a capacitor 24. The peak detector 23 is preferably a current amplifying peak detector.

The output of peak detector 23 is directly connected to a storage capacitor 25. The peak voltage stored in the capacitor 25 is transferred to a capacitor 26 by the closure of a switch $S_2$ which is closed slightly prior to the closure of the switch $S_1$. A short period later, such as 40 milliseconds in the preferred embodiment, both of the switches $S_1$ and $S_2$ are opened thereby holding a stored signal in capacitor 26, but allowing capacitor 25 to discharge through a resistor 27 and charge to a new peak level during the next duty cycle of the switches $S_1$ and $S_2$.

Resistor 28 and capacitor 29 comprise a filter network having a time constant which is long as compared to the short period the switches $S_1$ and $S_2$ are closed, but short relative to the long period during which the switches $S_1$ and $S_2$ are open. For example, in the preferred embodiment, the time constant would be 1 second. In that manner, smooth transition from one level to the next is provided as the switch $S_2$ is actuated.

The output of the filter network is coupled to the electrometer input terminal or summing junction through a resistor 30 having an ohmic value equal to that of the feedback resistor 17 so that the transfer ratio of the signal from the filter network to the output terminal of the electrometer is equal to one.

A third switch $S_3$ connects a resistor 31 in parallel with the resistor 27 just prior to closure of the switches $S_1$ and $S_2$, such as 200 milliseconds before the switch $S_2$ is closed in order to more fully discharge the capacitor 25 and, as an added precaution, to discharge any voltage which may have accumulated during the relatively long period (20 seconds in this example) as a result of noise, leakage, or cosmic ray activity.

A fourth switch (not shown), which may also be a magnetic relay switch, may be included to clamp the input terminal of the peak detector 23 to ground except during the time an input charge is being transferred to the operational amplifier 12. The timing unit 16 may be employed for that purpose by so connecting it to the fourth switch that it opens when the first switch $S_1$ closes, and vice versa. The function of the fourth switch is to further reduce noise sensitivity of the circuit.

The following component values are provided by way of example to more fully illustrate the preferred embodiment of application's invention. It should be understood that such values are not necessarily optimum, and that many may require some change in value depending upon the characteristics of the active elements and associated circuitry selected for the amplifiers 12 and 21, and the amplifying peak detector 23.

| Component | Value |
|---|---|
| Capacitor 11 | 5 picofarads |
| Capacitor 14 | 20 picofarads |
| Resistor 15 | $10^{19}$ ohms |
| Capacitor 13 | 10 picofarads |
| Resistor 17 | $4 \times 10^{11}$ ohms |
| Capacitor 18 | 20 picofarads |
| Capacitor 22 | 4 microfarads |
| Capacitor 24 | 0.2 microfarads |
| Capacitor 25 | 1 microfarads |
| Resistor 27 | $10^6$ ohms |
| Capacitor 26 | 0.33 microfarads |
| Resistor 28 | $20 \times 10^6$ ohms |
| Capacitor 29 | 0.05 microfarads |
| Resistor 30 | $4 \times 10^{11}$ ohms |
| Resistor 31 | $33 \times 10^3$ ohms |
| Resistor 32 | $10^3$ ohms |
| Resistor 33 | $22 \times 10^3$ ohms |
| Resistor 34 | 10 ohms |

A circuit as described, with the fourth switch, has demonstrated a capability of measuring a concentration of $C^{14}O_2$ in nitrogen of less than 2 picocuries per cc., using a 500 cc. ion chamber.

In operation, a charge is accumulated by the capacitor 11 over a relatively long period and transferred to the amplifier 12 over a shorter period. This may be regarded as AC amplification or pulse amplification. Through the peak detector, the peak of the pulse transferred to the amplifier is detected then transferred to the amplifier 12 through the switch $S_2$ which remains closed while the switch $S_1$ is closed. This may be regarded as DC amplification or signal storage. Thus, both methods of amplification (AC and DC) can be accomplished simultaneously, each with minimal effects on the other. The DC loop which includes the peak detector augments the pulse which is transferred to the amplifier 12 as a voltage spike of approximately half the duration of the period the switch $S_1$ is closed, namely 20 milliseconds in this example of a preferred embodiment.

As noted hereinbefore, the time constant of the signal storage network in the DC loop is large (approximately 150,000 seconds in the specific example) relative to the period the switches $S_1$ and $S_2$ are closed to produce a smooth transition from one level to the next as the measurement (of radioactive carbon dioxide by an ionization chamber in the illustrated embodiment) varies. The coupling network to the AC amplifier has a much shorter time constant (20 milliseconds in the specific example). Thus, AC pulse amplification is achieved through the operational amplifier 12 and AC amplifier 21, and DC amplification or storage is achieved through the operational amplifier 12 by virtue of the long time constant in what has been termed the DC loop.

The peak detector 23 is preferably biased approximately 250 millivolts below the amplified noise level of the amplifier 12 for noise rejection. The result is nonlinear operation in the lower 5 percent of the amplifier range but linearity is good from approximately one-half volt to 10 volts output with a current signal from the ionization chamber in the order of $10^{-16}$ to $10^{-15}$ amperes, and nose sensitivity is minimized. Amplifications of the input signal is realized from the increase of the effective average impedance seen by the ionization chamber due to the large ratio of charge time to discharge time of the capacitor 11 which in this illustrated example is a ratio of 500 to 1.

This invention has been illustrated as an amplifier for the output of an ionization chamber used in conjunction with a continuous respiratory analysis system for the detection of radioactive carbon dioxide. However, as a current amplifier able to produce a pulse the amplitude of which is proportionate to the input signal, and able to detect and hold the peak DC voltage of the pulse produced, this invention will have other applications, possibly with some alterations. For instance, this invention can be used to offset to a large degree the inherent drift problems of similar amplifiers using field-effect transistors in place of electrometer tubes for the input stage or stages of a DC amplifier. Increase in sensitivity without a corresponding increase in direct DC gain has the effect of minimizing drift-to-output ratios. Thus, a major advantage of this invention which may be employed in many applications is a large increase in current sensitivity.

While the principles of the invention have now been made clear in an illustrative embodiment, obvious modifications particularly adapted for specific environments and operating requirements may be made without departing from those principles. The appended claims are therefore intended to embrace any such modifications.

What is claimed is:

1. A high sensitivity amplifier for minute currents comprising
   a DC operational amplifier,
   first means for receiving and storing a charge in proportion to the magnitude of said minute current over a relatively long period of time and for transferring the minute charge stored to the input of said operational amplifier over a shorter period of time,
   peak detecting means connected to the output of said operational amplifier for detecting the peak of the voltage signal generated by said operational amplifier in response to said minute charge, transferring
   second means connected to the output of said peak detecting means and said operational amplifier input for receiving and storing the peak of said voltage signal during at least a portion of the time said first means is storing a charge and for transferring the peak of said voltage signal stored to said operational amplifier during at least all of the time that said minute signal is being transferred to said operational amplifier.

2. A high sensitivity amplifier as defined by claim 1 wherein said first means comprises an integrating capacitor connected to minute current source, said capacitor being coupled to the input terminal of said amplifier by closure of a first switch during said shorter period of time.

3. A high sensitivity amplifier as defined in claim 2 wherein said second means comprises a first storage capacitor connected to the output of said peak detecting means and a second storage capacitor and filter network connected to said first storage capacitor by closure of a second switch during at least all of the time said first switch is coupling said integrating capacitor to the input terminal of said operational amplifier.

4. A high sensitivity amplifier as defined by claim 3 wherein said first means includes a resistor in parallel with a filter capacitor and said filter capacitor is coupled to said operational amplifier by a DC blocking capacitor.

5. A high sensitivity amplifier as defined by claim 3 including a third switch for briefly connecting a shunting circuit in parallel with said first storage capacitor just before said first and second switches are closed.

6. A high sensitivity amplifier as defined in claim 3 wherein said filter network comprises a coupling resistor and integrating capacitor the combination of which has a charging time constant shorter than said long period of time and longer than said shorter period of time.

7. A high sensitivity amplifier as defined by claim 3 wherein said peak detecting means includes an AC amplifier capacitively coupled to said operational amplifier output for providing amplification of the voltage signal the peak of which is to be detected and stored.

8. A high sensitivity amplifier as defined by claim 7 wherein said long period is so selected longer than said shorter period as to provide a desired high effective average input impedance of said first means.

9. A high sensitivity amplifier as defined by claim 11 wherein said filter network has a short charging time constant which is less than a second and a long storage time constant which is greater than 1 hour.

10. A high sensitivity amplifier as defined in claim 6 wherein said filter network is further connected through a resistor to said operational amplifier input, said resistor in combination with the filter integrating capacitor forming a long storage time constant.

PO-1050
(5/69)

UNITED STATES PATENT OFFICE
CERTIFICATE OF CORRECTION

Patent No. 3,605,030　　　　　　　　　　Dated September 14, 1971

Inventor(s) Marshall D. Elmore

It is certified that error appears in the above-identified patent and that said Letters Patent are hereby corrected as shown below:

Column 1, line 7,　"5 x $10^{113}$" should be --5 x $10^{-13}$--;
Column 1, line 12,　"$10^{116}$" should be --$10^{-16}$--;
Column 1, line 12,　"$10^{115}$" should be --$10^{-15}$--
Column 3, line 17,　"$10^{19}$" should be --$10^{-9}$--;
Column 3, line 70,　"$10^{116}$" should be --$10^{-16}$--;
Column 3, line 71,　"$10^{115}$" should be --$10^{-15}$--.

Column 4, line 39,　after "charge" delete --transferring--.

Column 5, line 8,　after "claim" delete "11 and insert --10--.

Signed and sealed this 28th day of March 1972.

(SEAL)
Attest:

EDWARD M. FLETCHER, JR.　　　　　　ROBERT GOTTSCHALK
Attesting Officer　　　　　　　　　　Commissioner of Patents